United States Patent [19]

Pratt

[11] Patent Number: 4,767,248
[45] Date of Patent: Aug. 30, 1988

[54] FASTENER FOR SECURING PANELS OF COMPOSITE MATERIALS

[75] Inventor: John D. Pratt, Rancho Cucamonga, Calif.

[73] Assignee: Monogram Industries, Inc., Culver City, Calif.

[21] Appl. No.: 840,733

[22] Filed: Mar. 18, 1986

[51] Int. Cl.⁴ ............................................. F16B 13/06
[52] U.S. Cl. ...................................... 411/45; 411/501; 411/901; 29/525.2
[58] Field of Search .................. 411/34, 35, 36, 37, 411/38, 40, 41, 42, 44, 45, 54, 56, 69, 75, 76, 77, 78, 79, 80, 500, 501, 502, 503, 504, 505, 506, 507, 900, 901, 902, 903; 29/526 R, 526 A

[56] References Cited

U.S. PATENT DOCUMENTS

| | | |
|---|---|---|
| 309,430 | 12/1884 | Wood . |
| 384,318 | 6/1888 | Kirks . |
| 1,487,290 | 3/1924 | Tomkinson . |
| 1,864,377 | 6/1932 | Sieffert . |
| 2,030,167 | 2/1936 | Miller . |
| 2,282,711 | 11/1940 | Eklund . |
| 2,314,445 | 3/1943 | Du Vall ........................... 411/44 |
| 2,370,776 | 3/1945 | Carlson ........................ 411/34 X |
| 2,393,564 | 1/1946 | Poupitch ....................... 411/504 |
| 2,410,398 | 10/1946 | Williams et al. . |
| 2,426,422 | 8/1947 | Torresen . |
| 2,438,976 | 4/1948 | Lautmann . |
| 2,511,920 | 6/1950 | Keller et al. . |
| 2,572,246 | 10/1951 | Colley et al. ................... 411/34 |
| 2,647,432 | 4/1953 | Huck ............................. 411/501 |
| 3,009,383 | 11/1961 | Block ............................. 411/70 |
| 3,009,384 | 11/1961 | Degen et al. .................. 411/70 |
| 3,208,331 | 9/1965 | Scholl . |
| 3,520,225 | 7/1970 | Baugh . |
| 3,869,956 | 3/1975 | Breer . |
| 3,984,466 | 7/1975 | Wibrow ...................... 411/900 X |
| 3,995,406 | 12/1976 | Rosman . |
| 4,221,041 | 9/1980 | Hufnagl et al. . |
| 4,457,652 | 7/1984 | Pratt . |
| 4,478,544 | 10/1984 | Strand . |
| 4,521,147 | 6/1985 | King et al. ..................... 411/44 X |

FOREIGN PATENT DOCUMENTS

| | | | |
|---|---|---|---|
| 1906989 | 2/1973 | Fed. Rep. of Germany ...... 411/500 |
| 2736012 | 2/1978 | Fed. Rep. of Germany ........ 411/44 |
| 511741 | 8/1939 | United Kingdom ................. 411/35 |
| 569949 | 6/1945 | United Kingdom ............... 411/500 |

*Primary Examiner*—Neill Wilson
*Attorney, Agent, or Firm*—Pretty, Schroeder, Brueggemann & Clark

[57] ABSTRACT

A fastener is provided for fastening together overlapping panels made from relatively soft materials, such as fiber reinforced composite materials, substantially without damage to the panels. The fastener comprises a generally tubular fastener body received within the openings of the panels. The fastener body has an enlarged body head for engaging the outer panel, an annular sidewall extending through the panel openings, and an endwall at the inner end of the fastener body. A plug having a tapered inner nose is positioned within the upper region of the fastener body in abutting contact with the body head and contiguous sidewall, and an annular sleeve is positioned within the lower region of the fastener body between the plug and endwall. During setting of the fastener, the sleeve deforms over the tapered nose and laterally expands the contiguous sidewall outwardly into a fully set condition in overlying contact with the outer surface of the inner panel.

22 Claims, 1 Drawing Sheet

FASTENER FOR SECURING PANELS OF COMPOSITE MATERIALS

FIELD OF THE INVENTION

The present invention relates to fasteners for use in fastening panels of composite materials substantially without damage to the panels.

BACKGROUND OF THE INVENTION

Problems have existed in the past when using fasteners to fasten panels made from composite materials, such as graphite composite and other soft materials. Typical problems have included damage to the panels resulting from installation forces required to properly install the fastener. For example, when very thin or soft sheets of material are utilized in the inner panel, the force applied by the fastener against the inner panel when the fastener is being set often deforms and sometimes crushes the inner panel and thereby weakens it at that point. As a result, the fastener never reaches a fully set condition. When this occurs, the panel often must be discarded and replaced, and significant time and money usually are lost.

Fasteners have been developed to overcome the above problems of fastening panels made of composite materials. One such fastener is disclosed in the inventor's U.S. Pat. No. 4,457,652 and comprises a fastener body inserted in aligned openings in the panels, and a drive stem threadedly mounted through the fastener body. Turning motion of the stem relative to the fastener body moves the stem axially outwardly through the fastener body and deforms a sleeve into overlying contact against the inner panel. The sleeve is provided with a thin walled section adapted to deform laterally and produce a sufficient blind side bearing surface against the inner panel without damaging it.

Other types of fasteners have been developed to fasten panels of composite materials without damaging them, such as conventional rivets with washers, multiple-piece bolts and rivets, bi-metallic rivets, and other types of fasteners. However, such fasteners and rivets generally are relatively expensive to manufacture and are not of a one-piece integral construction so that relatively significant amounts of time are needed to install them, or they do not form a satisfactory upset against the composite material.

Accordingly, there has existed a definite need for another type of fastener for joining panels of composite materials that produces a large bearing surface without damage to the inner panels, and which is a one-piece, low cost assembly for simple and quick installation using conventional setting tools. The present invention satisfies this need and provides further relate advantages.

SUMMARY OF THE INVENTION

The present invention provides a fastener for mounting in aligned openings through two panels to connect them together in overlapped outer and inner relation. The fastener comprises a one-piece assembly adapted for quick installation by conventional setting tools, and it is especially useful to fasten panels made of relatively soft materials, such as fiber reinforced composite materials, without damage to the panels. The fastener furthermore is intended to be simple in design, reliable in use, and inexpensive to manufacture.

The fastener comprises a generally tubular fastener body for mounting in the openings in the panels. The fastener body has an annular sidewall projecting inwardly beyond the inner panel, an enlarged body head for engaging the outer panel, and an endwall integral with the sidewall at the inner end of the fastener body. The sidewall, endwall and body head together define an enclosed, substantially cylindrical space or internal cavity. A plug having a tapered nose is positioned within the internal cavity against the body head and contiguous sidewall. At the opposite end of the cavity, a deformable annular sleeve is positioned between the endwall and tapered nose of the plug.

The fastener is set in the panels by a conventional setting tool that squeezes the fastener and deforms the sleeve outwardly over the tapered nose. Outward deformation of the sleeve in this manner expands the sidewall laterally into overlying contact with the outer surface of the inner panel and provides a relatively large bearing surface against the inner panel. This minimizes the application of axial stress applied directly to the panel, and securely fastens the panels substantially without damage to the panel surface.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
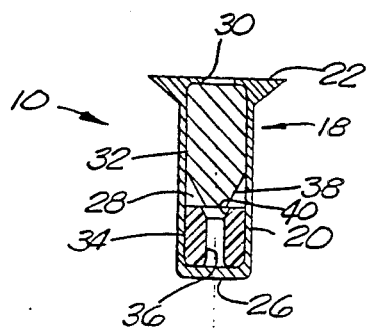
FIG. 1 is a cross-sectional view of an unset fastener embodying the novel features of the invention.

The present invention provides a fastener, indicated generally by the reference numeral 10, for mounting in aligned openings 12 through outer and inner panels 14 and 16 to connect them together in overlapped relation. The fastener comprises a generally tubular fastener body 18 having an annular sidewall 20, relatively thin in cross-section, with an integrally formed enlarged body head 22 at its outer end. In the preferred embodiment, the body head is tapered conically for reception in a countersunk hole 24 in the outer panel to provide a substantially flush, aerodynamic surface. However, a flush surface is not required, and any suitable body head configuration for engaging the outer panel may be used. The inner end of the fastener body has an endwall 26 formed integrally with the sidewall. The sidewall, endwall and body head together define a generally cylindrical enclosed space or internal cavity 28. The body head has a central axial opening 30 extending into the internal cavity which is formed in the manufacturing process of the fastener body as an integral, one-piece unit. A similar central axial opening (not shown) also could be formed in the endwall during the manufacturing process of the fastener, depending upon the methods employed.

A cylindrical plug 32 is positioned in the upper region of the internal cavity 28 and shaped to be in abutting contact with the body head 22 and contiguous sidewall 20. A deformable annular sleeve 34 with a central axial bore 36 is positioned in the lower region of the internal cavity between the plug and the endwall 26. The inner end of the plug opposite the body head has a tapered nose 38 inclined radially inwardly in a direction toward the sleeve and endwall. The sleeve also may be provided with a chamfered surface 40 around the bore therethrough to facilitate outward movement of the sleeve over the plug's tapered nose during setting of the fastener 10, as described below.

The fastener body 18 may be constructed as an integral unit from suitable materials such as stainless steel, for example A-286 stainless steel. The plug 32 preferably is constructed from a stronger material than the fastener body, such as titanium alloy or other suitable materials. The sleeve 34 is constructed from deformable, low tensile strength materials, such as polymers, including Delrin, Celcon, Teflon, nylon, or fiber reinforced versions of either. Other materials also may be used for the plug, such as softened metals including aluminum, copper and nickel, provided that the tensile strength of the sleeve material is substantially less than the tensile strength of the plug material.

Figure 2:
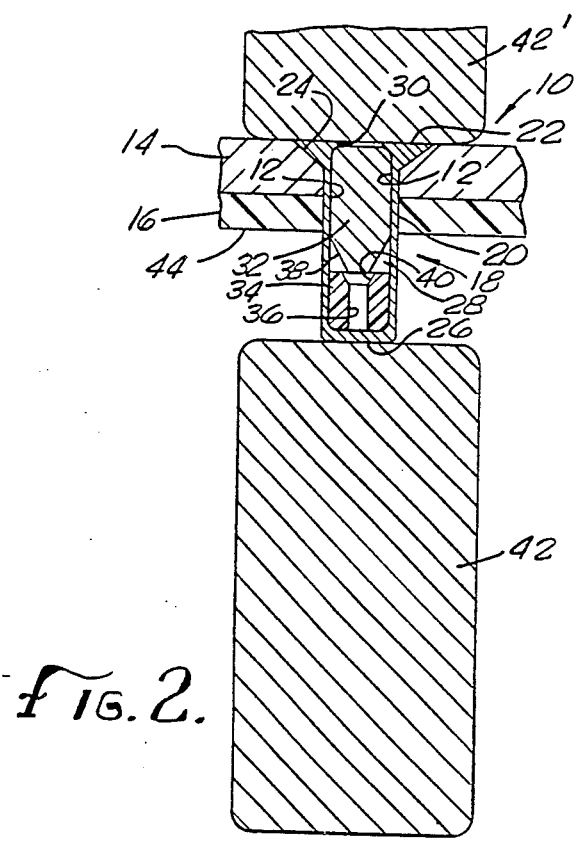
FIG. 2 is a cross-sectional view showing the unset fastener inserted in aligned openings in two panels with a setting tool in position to set the fastener.

Referring to FIG. 2, the fastener 10 is shown inserted in the aligned openings 12 of the overlapping outer and inner panels 14 and 16. The panels are illustrated as being made of composite materials, but it is understood that the fastener may be used to fasten panels made of various other materials as well. A conventional setting tool 42 is shown positioned over the inner end of the fastener. A similar setting tool 42' is positioned against the enlarged body head.

To install the fastener 10, the fastener is inserted into the aligned openings 12 of the panels 14 and 16 until the body head 22 is received in the countersunk hole 24 of the outer panel. The setting tool 42 then is positioned against the inner end of the fastener. The setting tool is actuated by a drive motor (not shown) that applies an outward force on the setting tool. The force of the setting tool against the endwall 26 moves the fastener sleeve 34 outwardly through the fastener body 18 and deforms it laterally around the tapered nose 38 of the plug 32. The relatively thin sidewall 20 in the area surrounding the sleeve likewise is deformed laterally by the outwardly expanding sleeve. A suitable counteracting force is applied to the body head 22 by the setting tool 42' to prevent the fastener 10 from moving within the openings 12 of the panels 14 and 16 during actuation of the setting tool 42 to set the fastener.

Figure 3:
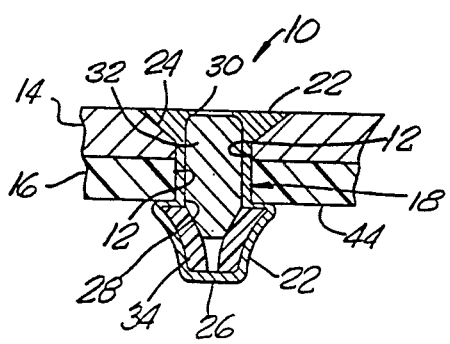
FIG. 3 is a cross-sectional view of the fastener in a fully set condition fastening the two panels together.

As can be seen from FIGS. 2-3, use of the setting tools 42 and 42' as described above expands the sleeve 34 outwardly over the tapered nose 38 of the plug 32 and laterally deforms the sidewall 20 of the fastener body 18 into overlying contact with the outer surface 44 of the inner panel 16. Damage to the inner panel substantially is avoided because the axial forces exerted against the fastener 10 by the setting tool 42 are translated largely into radial forces expanding the sleeve and sidewall laterally outwardly to produce a large bearing surface around the opening 12 in the inner panel, as shown in FIG. 3. This reduces the amount of axial stress applied directly to the inner panel, yet permits sufficient axial force to properly deform the sidewall against the inner panel to securely fasten the two panels together.

A significant advantage of the present invention is that it comprises a one-piece assembly intended to be manufactured quickly and inexpensively without need for precise machining of its component parts. The fastener 10 also has a grip range wide enough to properly fasten two panels having a combined thickness within certain pre-established ranges. This advantageously eliminates the need for a large inventory of different sized fasteners. Most significantly, however, the fastener effectively fastens panels made of composite material and provides a relatively large bearing surface against the inner panel substantially without damaging it.

From the foregoing, it will be appreciated that the fastener 10 of this invention quickly and easily fastens panels made of composite materials substantially without damaging them. As the fastener is set, the axial forces of the setting tool 42 are translated largely into radial forces expanding the sleeve 34 and fastener body sidewall 20 laterally outwardly to produce a large bearing surface and securely fasten the panels together. The fastener furthermore comprises a convenient one-piece assembly that is set using conventional setting tools.

While a particular form of the invention has been illustrated and described, it will be apparent that various modifications can be made without departing from the spirit and scope of the invention. Accordingly, it is not intended that the invention be limited, except as by the appended claims.

I claim:

1. A fastener for mounting in aligned openings through two panels to connect them together in overlapped outer and inner relation and adapted to be set by a setting tool, said fastener comprising:
    (a) a fastener body for receipt within the openings in the panels, said fastener body having,
        a generally annular sidewall for projecting inwardly beyond the inner panel, and
        an enlarged body head for engaging the outer panel;
    (b) a deformable sleeve positioned within said fastener body adjacent to the inner surface of said sidewall and
    spaced from said body head; and
    (c) means within said fastener body adjacent the top of said sleeve and between said sleeve and said body head for deforming said sleeve and said sidewall outwardly to a fully set condition in overlying contact with the outer surface of the inner panel when the top of the deformable sleeve moves toward the body head upon application of an axial force to both ends of the fastener.

2. The fastener of claim 1, wherein said means within said fastener body for deforming said sleeve is a cylindrical plug confined within said fastener body adjacent to the inner surfaces of said sidewall and said body head to substantially prevent movement thereof during setting of the fastener, said plug having an inner end tapered radially inwardly in a direction toward said sleeve, said sleeve being adapted to deform outwardly over said tapered inner end and to deform said sidewall outwardly to a fully set condition in overlying contact with the outer surface of the inner panel upon application of an axial force to the fastener.

3. A fastener for mounting in aligned openings through two panels to connect them together in overlapped outer and inner relation and adapted to be set by setting tools, said fastener comprising:
    (a) a generally tubular fastener body received within the openings in the panels, said fastener body having, a generally annular sidewall projecting inwardly beyond the inner panel, and an enlarged body head integral with said sidewall at the outer end of said fastener body for engaging the outer panel;

(b) a plug positioned within said fastener body adjacent to the inner surfaces of said sidewall and said body head, said plug having a tapered inner end tapered radially inwardly in a direction away from said body head; and (c) a deformable annular sleeve having an axial bore therethrough, said sleeve being positioned within said fastener body adjacent to the inner surface of said sidewall and said tapered inner end, the top of said sleeve being adapted to move toward said body head from a point spaced from said body head, to deform outwardly over said tapered inner end and to deform said sidewall outwardly to a fully set condition in overlying contact with the outer surface of the inner panel upon actuation of the setting tools to apply an axial force to both ends of the fastener.

4. The fastener of claim 3, wherein said sleeve has a chamfered surface around the outer end of its bore for engagement with said tapered inner end to facilitate deforming of said sleeve over said plug.

5. The fastener of claim 3, wherein said plug is made of a titanium alloy and said sleeve is made of a polymeric material.

6. The fastener of claim 3, wherein said fastener body is made of a metallic material.

7. The fastener of claim 6, wherein said metallic material is stainless steel.

8. The fastenher of claim 3, wherein the plug is confined entirely within the fastener body when the sleeve is in an undeformed condition.

9. The fastener of claim 1, wherein said deformable sleeve comprises a one-piece deformable sleeve.

10. The fastener of claim 9, wherein the top of said deformable sleeve adjacent to said deforming means is spaced from the outer surface of the inner panel before the fastener has been set.

11. The fastener of claim 10, wherein said deforming means comprises a plug and wherein the end of said plug is spaced from the outer surface of the inner panel both before and after the fastener has been set.

12. The fastener of claim 1, wherein said deformable sleeve comprises a flat top surface and wherein the flat top surface is substantially parallel to a top surface of said body head when said sleeve is in a final deformed condition.

13. The fastener of claim 1, wherein the deforming means is confined within said fastener body while said sleeve is in an undeformed condition.

14. In combination, a pair of panels to be connected together with a fastener, the combination comprising:
a first outer panel having a first opening and a first exposed surface;
a second inner panel having a second exposed surface and a second opening aligned with the first opening wherein the outer and inner panels overlap; and
wherein the fastener comprises:
a fastener body extending through the aligned openings, an enlarged body head at the outer end of the fastener body engaging the exposed surface of the first panel, a transverse wall in the fastener body spaced from the exposed surface of the second panel, deformable means positioned within the fastener body against the transverse wall and such that a portion of the deformable means closest to the second panel is spaced apart therefrom in a direction away from the enlarged body head when the deformable means is in an undeformed condition, and means within the fastener body between the body head and the transverse wall for deforming the deformable means and the fastener body outwardly to a fully set condition and wherein the deforming means includes an end extending beyond the second panel.

15. The combination of claim 14, wherein the deformable means comprises a sleeve.

16. The combination of claim 14, wherein the deforming means comprises a plug wherein the end comprises a plug end having a taper beginning and ending beyond the second panel.

17. The combination of claim 16, wherein the deformable means comprises a tubular member having an inside surface with a taper at one end adjacent to the plug end for contact therewith during setting of the fastener.

18. The combination of claim 14, wherein the deforming means is entirely contained within the fastener body when the deformable means is in an undeformed condition.

19. A method for fastening two panels together in overlapped inner and outer relation, the method comprising the steps of:
passing a generally tubular fastener body within aligned openings in the panels so that a generally annular sidewall projects beyond the inner panel a substantial distance and so that an enlarged body head of the fastener body engages the outer panel;
placing a first setting tool against the body head;
placing a second setting tool against an endwall which is integral with the sidewall of the tubular fastener body at an end of the fastener body opposite the body head;
moving the second setting tool toward an outer surface of the inner panel; and
deforming the top of a deformable sleeve contained inside the fastener body over a relatively non-deformable deforming surface inside the fastener body in a direction toward the body head and the outer surface of the inner panel.

20. The method of claim 19 further comprising the step of deforming the generally annular sidewall to a fully set condition in overlying contact with the outer surface of the inner panel.

21. The method of claim 19 further comprising the step of retaining the deforming means within the fastener body during the step of deforming.

22. The method of claim 19 wherein the step of deforming comprises the step of deforming the deformable sleeve while the non-deformable deforming surface is maintained substantially stationary.

* * * * *